Aug. 12, 1941.  C. S. COCKERELL  2,252,063
RADIO DIRECTION FINDER
Filed July 18, 1938  2 Sheets-Sheet 1
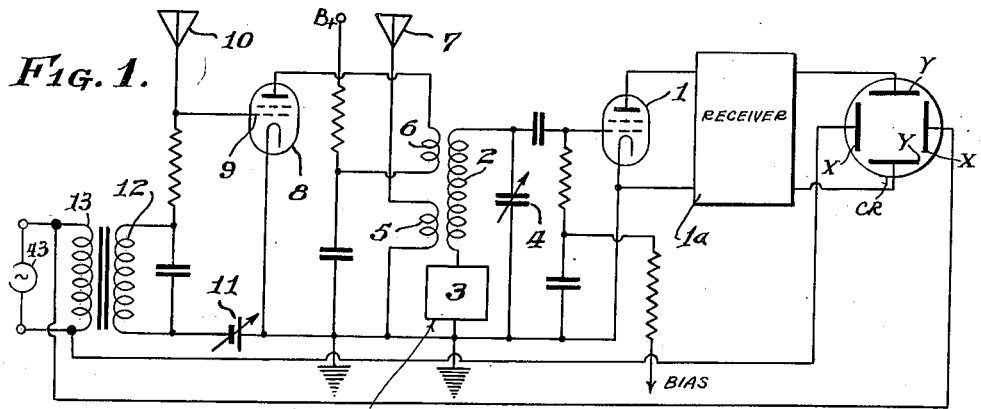
Fig. 1.
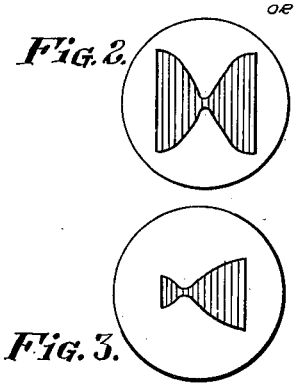
Fig. 2.
Fig. 3.
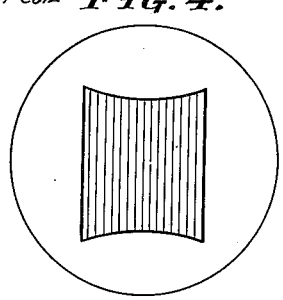
Fig. 4.
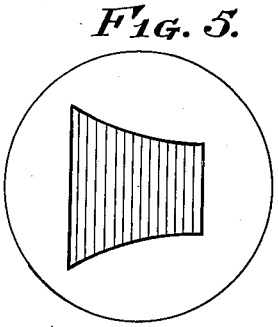
Fig. 5.
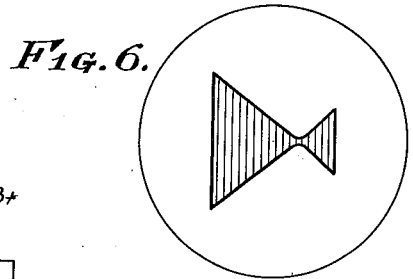
Fig. 6.
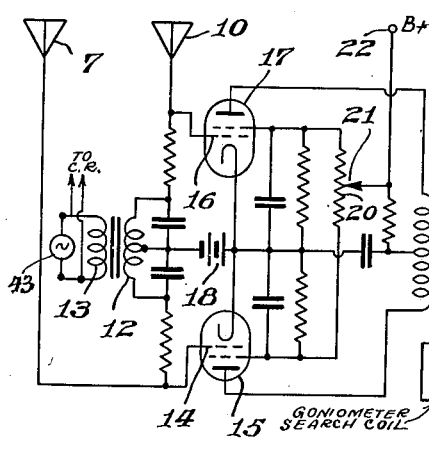
Fig. 8.
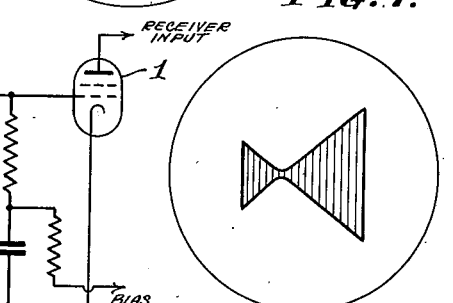
Fig. 7.
Inventor
Christopher S. Cockerell
By
Attorney

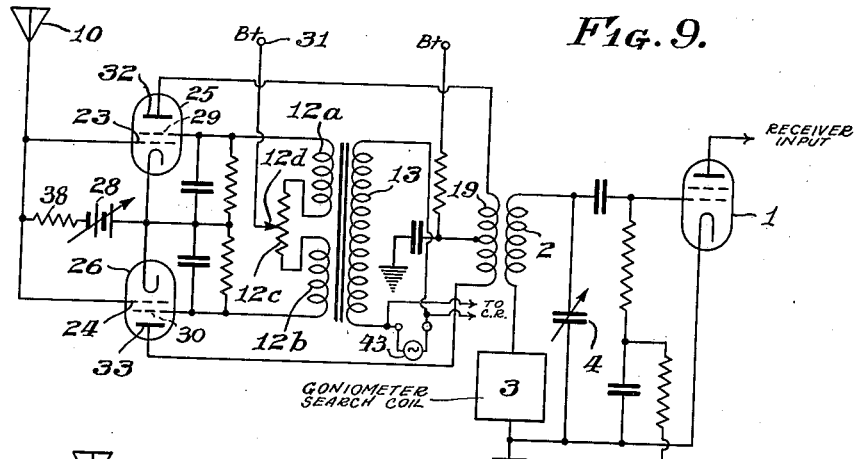
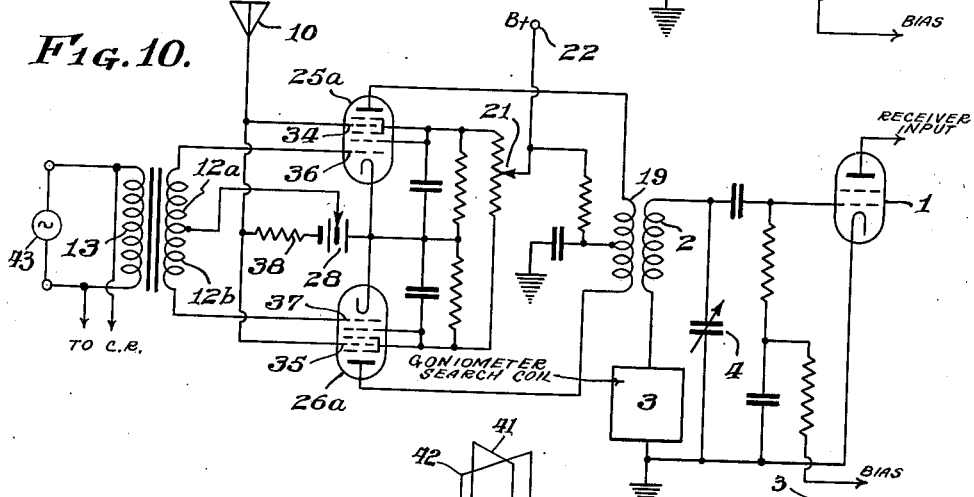
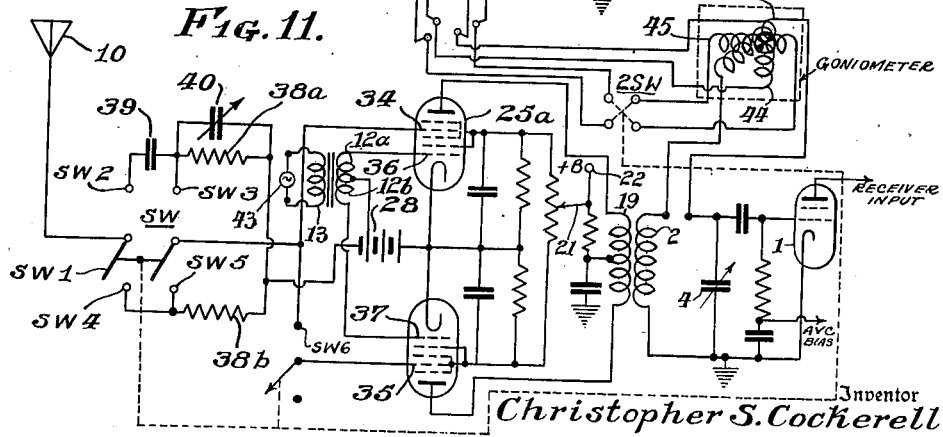

Patented Aug. 12, 1941

2,252,063

UNITED STATES PATENT OFFICE 2,252,063

RADIO DIRECTION FINDER

Christopher Sydney Cockerell, Danbury, England, assignor to Radio Corporation of America, a corporation of Delaware Application July 18, 1938, Serial No. 219,898
In Great Britain August 7, 1937

11 Claims. (Cl. 250—11)

This invention relates to direction finding radio receiving installations and has for its object to provide improved installations which shall involve a minimum of necessary operations on the part of the user, to obtain a bearing. Simplicity and speed of operation are very important desiderata for radio direction finders, especially for use on aircraft.

A typical normal simple aurally indicating radio direction finder as at present in use involves quite a long series of operations to take a bearing accurately, a typical series being as follows:

1. Switch on the receiver.
2. Actuate a switch which enables omni-directional reception to be effected.
3. Adjust volume control to ensure that the sensitivity is satisfactory having regard to the noise level existing at the time.
4. Tune in and identify the station whose bearing is to be found.
5. Readjust volume control.
6. Actuate a switch which enables the receiver to receive directionally in accordance with a figure of eight polar diagram.
7. Rotate directional frame aerial or radio-goniometer search coil (as the case may be) to find (approximately) the minimum signal position.
8. Readjust volume control.
9. Finely adjust frame aerial or search coil to find the minimum signal position more accurately.
10. Sharpen the minimum signal position with the aid of the normally provided "zero clearing" device.
11. Readjust frame aerial or search coil.
12. Readjust volume.
13. Readjust "zero clearing" device.
14. Again readjust frame aerial or search coil to obtain minimum signal position with maximum accuracy and note bearing.
15. Actuate a switch to change the directional polar diagram from figure of eight to cardioid.
16. Adjust volume control.
17. Rotate frame aerial or search coil to obtain a sense indication.

This long sequence of operations constitutes a serious disadvantage and the present invention seeks to provide a simple visually indicating direction finder which involves only a substantially shorter sequence. As will be seen later, the present invention can be utilized to provide a direction finder by which an accurate bearing can be obtained—with a sense reading—with only the following working operations:

1. Switch on the receiver.
2. Tune in and identify station.
3. Rotate frame aerial or search coil to minimum signal position.
4. Change over to a circuit for giving sense reading.

According to this invention a direction finding radio receiving installation comprises in combination a directional receiving aerial system, a combining circuit, means for applying to said combining circuit signals derived from said aerial system and two omni-directionally received signal components, said components being substantially in phase opposition to one another and in quadrature relation to the signals derived from the directional aerial system, means for cyclically and periodically varying said component relatively to one another at a predetermined frequency, a receiver properly fed from said combining circuit, an oscillograph indicator arrangement capable of deflecting its indicator in two mutually perpendicular directions, means for applying the output of the receiver proper to produce deflection in one of said directions, and means for producing deflection in the other of said directions in synchronism with said cyclical and periodic variation. The expression "directional receiving aerial system" is used in a wide sense to include not merely rotatable frame aerials but also systems such as a combination of fixed mutually perpendicular aerials and radio-goniometer.

The invention is illustrated in and explained in connection with the accompanying drawings in which Figure 1 is a schematic circuit diagram of one embodiment of the invention.

Figures 2, 3, 4, 5, 6 and 7 represent cathode ray patterns obtained in practicing the invention;

Figures 8, 9 and 10 are circuit diagrams of preferred embodiments; and

Figure 11 represents a circuit of the invention embodying a single non-directional antenna and mechanical switching.

In order that the invention may be better understood there will first be described with reference to Figure 1 a simplified circuit in accordance therewith. This circuit is not regarded as practically preferable but it is selected to be described first because of its simplicity.

Referring to Fig. 1, the input circuit of a receiver proper 1a—i. e., the grid circuit of the first valve 1 thereof—is a parallel tuned circuit and constitutes an example of the combining circuit required by the invention. This circuit includes in series a secondary coil 2 and the search coil 3 of a radio-goniometer forming part of the directional receiving aerial system of the installation, the series connected coils 2, 3 being in parallel with a tuning condenser 4. Two primary coils 5, 6 are coupled to this secondary coil 2. The first coil 5 is in the circuit of a first open or other omni-directional aerial 7 and the second coil 6 is in the plate circuit of a valve 8, preferably a valve of the variable-mu type (a screen grid valve is shown) whose control grid 9 receives input from a second open aerial 10 and whose grid circuit includes an adjustable bias source 11 and the secondary 12 of a transformer to whose primary 13 alternating voltage (e. g. a 50 cycle main voltage or some convenient audio frequency voltage) is applied. The phase shift produced by transformer 5, 2 causes the E. M. F. in the combining circuit derived from the first open aerial 7 to be in quadrature with that directionally derived from search coil 3, and to be of lower amplitude than the maximum directionally derived E. M. F. in said circuit. The E. M. F.'s in the combining circuit from the two open aerials are arranged to be in phase opposition to one another. The indicator of the installation is constituted by a cathode ray tube CR having mutually perpendicular ray deflector systems X—X and Y—Y, and the usual fluorescent screen. The output from the receiver proper 1a is fed to one deflector system (the Y system) and the other pair (the X system) is fed from the source 43 which feeds the primary of the transformer 13, 12.

With this arrangement if the signal components in the combining circuit from the two open aerials are equal these components will cancel out, but if that from one open aerial or the other preponderates, the phase will follow that of the preponderating component. The A. C. input in the grid circuit of the variable-mu valve, of course, alters its gain and therefore the said gain varies cyclically and periodically at the A. C. frequency so that, first one open aerial component preponderates and then the other.

In use the adjustable bias on the grid 9 of the variable-mu valve 8 is adjusted until the open aerial components in the combining circuit are equal and opposite at the instants when the A. C. voltage amplitude passes through zero. This adjustment is easily made with the aid of the tube because, if the search coil input is zero, e. g., when no signal is being tuned in on the directional aerial system, the envelope pattern obtained on the screen of the tube will be of the nature represented in Fig. 2, i. e., it will consist of two, roughly triangular, equal areas point-to-point when the adjustment is correct. If the adjustment is not correct the result will be as exemplified in Fig. 3, i. e., one triangle will be bigger than the other and the point where the apices meet, or approximately meet, will be nearer one or other end of the whole pattern. If after making this adjustment the search coil signal is added, the envelope pattern will change into a roughly rectangular pattern as represented in Fig. 4 if the search coil signal is of maximum strength. The dip in the middle corresponds to the signal amplitude of the loop alone, while the increased amplitude of the pattern at the edges is caused by the combination of the loop voltage with the differential of the vertical antenna voltages, added in quadrature. Upon rotating the search coil and therefore reducing the search coil signal the pattern first becomes roughly trapezoidal as represented in Fig. 5 and then gradually approaches a figure such as that of Fig. 6, with two approximate triangles point to point.

The bearing direction is that in which the envelope pattern is of zero or nearly zero height (assuming the output from the receiver proper is used to deflect the ray in the vertical direction) at some point along the vertical axis. Fig. 6 shows such a pattern. As will be appreciated, the said pattern is not necessarily composed of regular triangles and if its component areas be regarded as approximating to triangles the said triangles will not be equal nor the common apex point (the point of zero height) central because of vertical aerial effects in the receiving frame aerials and the said common apex point will be nearer one end than the other. On rotating the search coil from this position into the other minimum signal position, the pattern will reverse end to end and become as indicated in Fig. 7 since the phase of the signal components due to open aerial effects in the frames will be reversed. There is thus obtained a sort of automatic "zero clearing" device not involving manual control.

It will be noted that even when the search coil is in its minimum signal position, there are signals still received by the open aerials. Accordingly, the receiver proper may be, and preferably is, fitted with an automatic volume control system—whose time constant is, of course, long as compared to the time period of the A. C. fed to the grid of the variable-mu valve (the time base A. C.)—and therefore the need for manual volume control is avoided.

A practical difficulty with the circuit of Fig. 1 is that of ensuring an exact anti-phase relation as regards the open aerial signal components over a wide band of wave lengths.

In a preferred modification shown in Fig. 8, one open aerial 7 feeds into the control grid 14 of one valve 15 and the other open aerial 10 feeds into the control grid 16 of another valve 17, the valves 15, 17 being variable-mu screen grid valves. The two control grid circuits which may be either of the resonant or of the aperiodic type have a common part which includes a fixed bias source 18 and there is also provided a low frequency A. C. source 43 which feeds through a transformer 13, 12, so connected that when the A. C. voltage applied to one control grid is positive; that applied to the other is equal but negative. In other words, the control grid circuits are in parallel as regards radio frequency input voltages and fixed bias voltages but in push pull as regards low frequency A. C. input voltages. The anode circuits are in push pull and the divided output coil 19 is coupled to a coil 2 which is in series with a goniometer search coil 3 in the grid circuit of the first valve 1 of the receiver proper. Preferably the screen grids are connected together through a resistance 20, on which an adjustable tap 21 is connected at 22 to a suitable positive potential source (not shown). Adjustment of this tap 21 does not affect the bearing accuracy, the said adjustment, which may be made at any time, serving merely to facilitate the obtaining of a symmetrical envelope pattern. The rest of the circuit requires no description and the arrangement of the cathode ray tube may be as described in connection with Fig. 1.

In the modification shown in Fig. 9, only one open aerial 10 is used, instead of two, feeding in parallel to the two control electrodes 23, 24, of two variable-mu screen grid valves 25, 26, having a common adjustable grid bias source 28. The A. C. (low frequency) input from source 43, in this embodiment, applied in push-pull between the screen grids 29, 30 of the two valves by means of a transformer having primary 13 and a divided secondary winding the two halves 12a, 12b of which are connected together through a potentiometer 12c having a tap 12d connected at 31 to the source (not shown) of screen grid potential. The anodes 32, 33, of the two valves 25, 26 are connected to a source of anode potential. The anodes of the two valves are connected in push-pull and output taken from the divided output coil 19 as in Fig. 8. The circuit of Fig. 9 offers the advantage of requiring only one open aerial and simplified sense switching, but, on the other hand, more power is required to be supplied from the A. C. (time base) source 43 than in the embodiment of Fig. 8.

In another modification requiring only a single open aerial 10 and shown in Fig. 10, the variable-mu screen grid valves 25, 26, of Fig. 9 are replaced by heptodes 25a, 26a and the open aerial input is taken to the second control grids 34, 35, (i. e. the fourth grids counting from the cathodes) in parallel, the A. C. (time base) input being applied in push pull to the first grids 36, 37. The A. C. may be applied via a transformer 13, 12a, 12b whose secondary 12a, 12b is connected between said first grids and has a centre tap connected to an adjustable tap on a potential source 28 which is in series with a resonant circuit or with an aperiodic (resistive circuit)—a resistance 38 is shown—between the common cathode point and the two fourth grids. The second, third and fifth grids are screen grids. The rest of the circuit may be as in the embodiment of Fig. 8. The advantages of this circuit are the same as those of the embodiment of Fig. 9, but the disadvantage is that the valves are of a low mutual conductance type and therefore a fairly large open aerial will be required.

In the embodiment of Fig. 8 there are two similar input impedances, one connected to the control grid of one and the other to the control grid of the other of the two variable-mu valves, while in the embodiments of Figs. 9 and 10 there is a single input impedance 38 common to the signal input grids of both valves. These input impedances may, in any case, be of the resonant type or of the aperiodic type. In each case, however, if the resistance value or values of the input impedance or impedances (as the case may be) is made large as compared to the total effective capacitative impedance or impedances in shunt thereacross, the phase of the "zero clearing" voltage will be changed and may be made the same as that of the frames. The frame E. M. F. will then add or subtract according to its phase.

It is possible so to arrange matters that the "minimum" (i. e. the common apex point) in the envelope pattern appears nearer one predetermined end (say the left) of the whole pattern if the sense is correct but nearer the other if 180° must be added to a bearing. Alternatively, it is possible so to arrange matters that, when the sense switch is operated to give a sense reading, a "minimum" appears if and only if the sense is correct, no minimum appearing if it is 180° out.

One way of modifying the embodiment of Fig. 10, for example, to obtain the first of these two results will now be described with reference to Fig. 11. In place of employing a single input impedance 38 permanently connected in the common portion of the control grid circuits of the two variable-mu valves 25a, 26a, two alternative input impedance networks are utilized in cooperation with a double pole double throw switch SW. One "blade" SW1 of the switch is connected to the open aerial 10 and the other is connected to the two signal input grids 34, 35 (the fourth grids in the case considered). One pair of contacts SW2, SW3 on one side of the switch are connected to one another through a first condenser 39. Contact SW3 is also connected through an input impedance 38a, having an adjustable shunt condenser 40 across it, and thence through a bias battery 28 to the common cathode point. The remaining pair of switch contacts SW4, SW5 are connected together and through a second input impedance 38b and the said bias battery 28 in series to the common cathode point.

The reactance of the adjustable shunt condenser 40 is small as compared to that of the input impedance 38a across which it is connected and is adjusted to obtain the required input amplitude. This adjustment is not critical and therefore this condenser may be preset. The double pole switch SW is gang-controlled with a second double pole double throw switch 2SW which is connected to reverse, when operated, the connections of either one, for example 42, of the two mutually perpendicular loop aerials 41, 42 which are connected to the goniometer field coils 44, 45, respectively, thus shifting the antenna "maximum" position through 90° on the goniometer search coil scale. Rotation of the search coil 3 through 90° is thus rendered unnecessary when determining the "sense."

If the double pole double throw switches SW be provided with an additional contact SW6 arranged to put one of the two valves out of action when said switch is in the "sense" position—e. g. to break one of the operating grid circuits—the second of the two results above mentioned will be achieved, for, with one valve out of action the "zero clearing" voltage will be allowed to vary from a maximum to a minimum only instead of passing through the zero to another maximum in anti-phase.

It will be observed that since a signal is received for all positions of the search coil it is unnecessary to provide for omni-directional reception and there is the added advantage that a signal can be heard while taking a bearing. If a sensitive set is used A. V. C. control voltage can be obtained, even in the absence of a signal, as a result of "valve hiss" (thermal noise) in the first stage of the receiver, and, if a reasonably large vertical aerial is used, the noise introduced by the automatic "zero clearing" valves may be made negligible compared with the thermal noise of the first tuned circuit of the receiver.

The time constant of the A. V. C. system must be made long or the system dispensed with altogether for working with I. C. W. or C. W. signals.

If the carrier output from the receiver is rectified the resultant low frequency will, when the search coil is set to the minimum position, contain a strong component of twice the low frequency component supplied from the mains or other source to the transformer and this component will be at a maximum for the correct bearing. Accordingly this voltage may be filtered out and used to indicate the minimum position by applying it to a voltmeter. If the filter is constructed to attenuate all other frequencies strongly, the frequency band of the indicator could be made very narrow—say 25 cycles or so—and therefore a bearing could be obtained from a station of very low field strength. If the "zero clearing" voltage at maximum be arranged to be about $\frac{1}{10}$ of that of the directionally received signals at maximum, an interfering station would have to be within ±6° of the required station before it would produce any output to operate the voltmeter indicator. Thus very high directional selectivity is obtainable—so much so that it may be found possible satisfactorily to employ miniature Adcock or opposed frame directional aerial systems on medium or long waves.

I claim as my invention:

1. A direction finding radio receiving installation comprising in combination a directional receiving aerial system, a combining circuit, means for applying to said combining circuit signals derived from said directional aerial system, means for producing two omni-directionally received signal components, means for applying said components to said combining circuit in phase opposition to one another and in quadrature relation to the signals derived from the directional aerial system, means for cyclically and periodically varying the amplitudes of said components relatively to one another at a predetermined frequency, a receiver proper adapted to be fed by signals from said combining circuit, an oscillograph indicator arrangement including means for deflecting its indicator in two mutually perpendicular directions, means for applying the output of the receiver proper to produce deflection in one of said directions, and means for producing deflection in the other of said directions in synchronism with said cyclic and periodic variation.

2. A direction finding radio receiving installation comprising in combination a directional receiving aerial system, a combining circuit, means for applying to said combining circuit signals derived from said directional aerial system, a pair of omni-directional aerials for producing two omni-directionally received signal components, means for applying said components to said combining circuit in phase opposition to one another and in quadrature relation to the signals derived from the directional aerial system, means for cyclically and periodically varying the amplitudes of said components relatively to one another at a predetermined frequency, a receiver proper adapted to be fed by signals from said combining circuit, an oscillograph indicator arrangement including means for deflecting its indicator in two mutually perpendicular directions, means for applying the output of the receiver proper to produce deflection in one of said directions, and means for producing deflection in the other of said directions in synchronism with said cyclic and periodic variation.

3. A direction finding radio receiving installation comprising in combination a directional receiving aerial system, a combining circuit, means for applying to said combining circuit signals derived from said directional aerial system a pair of omni-directional aerials for producing two omni-directionally received signal components, means including a control tube in circuit with one of said aerials for applying said components to said combining circuit in phase opposition to one another and in quadrature relation to the signals derived from the directional aerial system, means for varying the amplification of said control tube cyclically and periodically to vary the amplitudes of said components relative to one another at a predetermined frequency, an oscillograph indicator arrangement including means for deflecting its indicator in two mutually perpendicular directions, means for applying the output of said combining circuit to said oscillograph to produce deflection in one of said directions, and means for producing deflection in the other of said directions in synchronism with said cyclic and periodic variation.

4. An installation as claimed in claim 1 wherein the receiver proper includes an automatic volume control circuit whose time constant is long as compared to the time period of the means for cyclically varying the amplitudes of the omni-directionally received components relatively to one another.

5. An installation as claimed in claim 2 wherein the receiver proper includes an automatic volume control circuit whose time constant is long as compared to the time period of the means for cyclically varying the amplitudes of the omni-directionally received components relatively to one another.

6. An installation as claimed in claim 3 wherein said means for applying the output of said combining circuit to said indicator includes a receiver having an automatic volume control circuit whose time constant is long as compared to the time period of the means for cyclically varying the amplitudes of the omni-directionally received components relatively to one another.

7. In a direction finding radio receiving installation, the combination including means for deriving directionally received signal components, means for deriving two omni-directionally received signal components, means for combining said omni-directionally received components in phase opposition to one another, means for cyclically varying the relative amplitudes of said components, means for combining said directionally received component in phase quadrature with said combined components to produce a resultant, and indicating means responsive to the instantaneous amplitude of said resultant.

8. A direction finding radio receiving installation comprising in combination a directional receiving aerial system, a combining circuit including a coupling transformer having a pair of primary windings, a pair of omni-directional receiving aerials, means connecting one of said omni-directional aerials to one of said primary windings, and means including a control tube connecting the other of said omni-directional aerials to the other of said primary windings, means for applying to said combining circuit signals derived from said directional aerial system, means including said control tube for cyclically and periodically varying the relative amplitudes of signal components from said omni-directional aerials, an oscillograph indicator including means for deflecting its indicator in two mutually perpendicular directions, means for applying the output of said combining circuit to produce deflections in one of said directions, and means for producing deflections in the other of said directions in synchronism with said cyclic and periodic variation.

9. A device of the character described in claim 2 in which said means for applying said components to said combining circuit in phase opposition to one another includes a pair of control valves having input and output circuits, means respectively coupling said omni-directional aerials to the input circuits of said valves, and means connecting the output circuits of said valves to said combining circuit so that said components are impressed in phase opposition on said combining circuit.

10. A direction finding radio receiving installation comprising in combination a directional receiving aerial system and two omni-directional aerials for producing two omni-directionally received signal components, a pair of control tubes having input and output electrodes, means connecting said omni-directional aerials to respective input electrodes, means for oppositely and cyclically varying the amplification of said tubes, a combining circuit, means coupling said components in phase opposition to said combining circuit, means for combining signals derived from said directional receiving aerial in phase quadrature with said out-or-phase components, an oscillograph indicator including means for deflecting said indicator in two mutually perpendicular directions, means for applying the output of said combining circuit to said oscillograph to produce deflections in one of said directions, and means for producing deflections in the other of said directions in synchronism with said cyclic variations.

11. A direction finding radio receiving installation comprising in combination an omni-directional aerial, a pair of control tubes having input and output electrodes, means including a selector switch for alternatively connecting said aerial to said input electrodes directly or through a phase-shifting device, a directive aerial system including a pair of directive aerials, a second switch operatively connected to said selector switch for reversing the phase of one of said directive aerials, a third switch included in the input circuit of one of said tubes for making said tube inoperative in one position of said selector switch, means for oppositely and cyclically varying the amplification of said tubes, a combining circuit, means for impressing output currents from said tubes in phase opposition on said combining circuit, means for impressing signals derived from said directional receiving aerial on said combining circuit in quadrature phase with said out-of-phase output currents, an oscillograph indicator including means for deflecting said indicator in two mutually perpendicular directions, means for applying the output of said combining circuit to said oscillograph to produce deflections in one of said directions, and means for producing deflections in the other of said directions in synchronism with said cyclic variations.

CHRISTOPHER SYDNEY COCKERELL.